United States Patent Office 3,472,803
Patented Oct. 14, 1969

3,472,803
LATEX CASTING SYSTEM
Paul W. Andrews and Forrest I. Peters, Raleigh, N.C., assignors to Corning Glass Works, Corning, N.Y., a corporation of New York
No Drawing. Filed July 13, 1965, Ser. No. 471,708
Int. Cl. C08f 45/04; C08d 7/02
U.S. Cl. 260—17                                       13 Claims

ABSTRACT OF THE DISCLOSURE

A composition for slip casting sheets to produce smooth nonporous ceramic articles upon sintering comprising an aqueous polymer latex emulsion containing a dispersing agent and from 70 to 83% by weight of non-hydroscopic ceramic particles. The ceramic particles are sufficiently small, preferably having a particle size distribution of 0.2 to 12 microns, so that the resulting sheet is self-supporting and flexible in the green state and has a smooth non-porous surface in the first or sintered state.

---

This invention relates to an aqueous later composition for casting ceramic articles.

Thin high dielectric ceramic plates of uniform density are used as substrates for microcircuits. Because of the high quality control standards necessary in the field of microcircuitry, it has been difficult to produce these ceramic substrates on a commercial scale. Ceramic plates can be formed by a doctor-blade casting technique, as shown by U.S. Patent 2,582,993, G. N. Howatt. The major problem in this area is the provision of a suitable casting composition for forming the dielectric article.

The casting composition should have an aqueous vehicle rather than an organic one. In addition to being less expensive, aqueous casting compositions do not present the health hazard presented by the evaporation of organic solvents and thereby permit removal of the vehicle into the atmosphere. Furthermore, the non-ceramic ingredients of the casting composition should essentially completely volatilize during the firing step to yield an uncontaminated article. Additionally, the casting composition should produce a flexible green article. This is important since rigid casts are likely to be damaged prior to the firing step. One of the essential qualifications of the casting composition is that it produces a green article which exhibits low firing shrinkage. Ideally, a firing shrinkage of 0 is the goal. Conventional slip casting systems produce green articles which shrink approximately 8% to 18% upon firing.

Accordingly, it is an object of this invention to provide an aqueous latex casting composition for forming ceramic articles. Additionally, it is an object of this invention to provide an aqueous latex casting composition containing components which essentially completely volatilize during the firing step without appreciable shrinkage of the fired article.

These and other objects of this invention are accomplished by providing an aqueous composition containing a latex emulsion, a large amount of alumina or other ceramic particulate, and various surfactants, thickeners and flexibility improvers.

The casting composition of this invention contains large amounts of a particulate non-hygroscopic ceramic material. Any known sinterable ceramic material which is non-hygroscopic can be used. By sinterable ceramic material is meant an inorganic substance in the crystalline or amorphous state which can be compacted or agglomerated by heating to a temperature near, but below the temperature at which it melts or has low enough viscosity to deform. Thus glasses such as boro-silicates, soda-lime-silicates, lead-silicates, alumino-silicates, etc., materials such as alumina, fosterite, steatite, zirconia, uranium dioxide, beryllia, or combinations of such materials are suitable for the present purpose.

The non-hygroscopic ceramic material used in the casting compositions of this invention is finely ground, having a particle distribution of 0.2–12 microns. The casting composition contains from 70% to 83% by weight of ceramic and in a preferred embodiment, about 78.9% by weight is used. This high ceramic loading of the casting system produces a green article which inhibits low firing shrinkage. Normally, articles prepared from these compositions will shrink only about 13% upon firing, which is equivalent to the shrinkage exhibited by articles formed by conventional dry pressing techniques. It is critical that the amount of ceramic be within the ranges specified. It has been found that when the amount of ceramic is as low as 65% by weight, the casting composition is too thin for accurate thickness control and the particles are not sufficiently close together for proper sintering. When the composition contains an amount of ceramic in excess of 85%, the binder concentration is too low to yield a strongly bonded green preform. Alumina is the preferred ceramic for use in these compositions.

A wide variety of latex emulsions can be used as the binder component of these compositions. Preferably, an aqueous styrenebutadiene copolymer is employed. In a preferred embodiment, a 47% to 49% solid content butaprene emulsion is used. Emulsions of this type are supplied under the trademarks of XR–3100 and XR–3113. These aqueous emulsions exhibit the following properties:

| | |
|---|---|
| Specific gravity | 1.010±0.010 |
| Density (wet basis) _____lbs./gal__ | 8.42±0.08 |
| Total solids (percent) | 48.0±1.0 |
| pH | 8.0±0.5 |
| Surface tension _____dynes/cm__ | 31±4 |
| Viscosity, Brookfield, #1 spindle at 60 r.p.m. _____cps. maximum__ | 100 |

When the XR–3100 or XR–3113 emulsions are employed, they should be used in an amount in the range of from 4% to 12% by weight of the final composition, with about 6.1% being preferred. When the amount of emulsion is less than 4%, the cast strength of the green article is substantially decreased and the article cannot be easily handled. When the amount of latex employed exceeds 12%, the casting composition is too thick for proper casting and thus, the ceramic is not uniformly dispersed in the green article.

The composition further contains various surfactants, dispersants and thickening agents. Any surface active agents compatible with the latex emulsion can be used. These include a wide variety of non-ionic, anionic, and cationic surfactants, and mixtures thereof. Since the green article must be of a uniform density, it is preferred to use a low foaming surfactant, such as a ditertiary acetylenic glycol. One particularly preferable surfactant of this type is a 50% solution of a ditertiary acetylenic glycol in ethylene glycol furnished under the trademark Surfynol 104E. This material has a specific gravity of 1.001 at 25° C. The preferred surfactant can be used in combination with other surface active agents. Since Surfynol 104E inhibits foaming, it is possible to increase the surface activity without increasing the amount of foaming which takes place.

It has been found that superior products are obtained when the casting composition contains, as an additional surface active agent, the sodium salt of a carboxylated polyelectrolyte. These anionic surfactants function as dispersing agents in the compositions. One suitable dispersing agent of this type is a 25% aqueous solution of a sodium salt of a carboxylated polyelectrolyte furnished under the trademark Tamol 731. This material can be used in conjunction with or instead of the ditertiary acetylenic glycol surfactant. Thus, the casting composition can contain up to 2.5% by weight of a 50% solution in ethylene glycol of a ditertiary acetylenic glycol and up to 1.5% by weight of a 25% aqueous solution of a carboxylated polyelectrolyte dispersing agent. If the amounts of these two ingredients are increased above the preferred ranges, the casting composition has a very low viscosity which makes accurate casting difficult. Furthermore, the dried cast is difficult to handle because of a reduction in green strength which results. In a particularly preferred embodiment, about 0.40% of the ditertiary acetylenic glycol solution and about 0.44% of the carboxylated polyelectrolyte solution are incorporated into the casting composition.

The casting composition can also contain a thickening agent. By using suitable amounts of a thickening agent, the viscosity of the casting composition can be maintained within limits which favor the production of uniform articles. Preferably, the viscosity of the casting slip is between 1800 and 2200 cps. as measured with a Brookfield viscosimeter. A preferred thickening agent is polyacrylic acid. The nonionic thickener is supplied as a 25% aqueous solution under the trademark Acrysol A-1. It is preferred to adjust the pH of this solution to approximately 9 by the addition of ammonium hydroxide thereto prior to use. A 25% aqueous solution of polyacrylic acid is used in amounts up to 2% by weight of the final casting composition, 0.98% being preferred. Although this material serves to control the viscosity of the casting composition, it also functions as a dispersing and defoaming agent. Thus, it can be used in addition to or in lieu of the previously mentioned surface active agents. The polyacrylic acid solution, in addition to its other properties, reduces the adhesion of the green articles to the casting surface and thereby increases the efficiency of the operation. In addition to the polyacrylic acid thickening agent, other well-known thickeners, such as hydroxy ethyl cellulose, can be used. Hydroxy ethyl cellulose added as a 2% solution is used in amounts up to 5.6% of the casting composition.

It is important that the green article be of sufficient flexibility to prevent breakage prior to firing. Although articles produced from the above composition are sufficiently flexible to provide a major improvement in the production of ceramic articles, it has been found that this flexibility can be enhanced by adding a small amount of triethanolamine to the casting composition. The triethanolamine forms a partial salt with the polyacrylic acid thickening agent which leads to the deposition of a film having improved flexibility characteristics. When triethanolamine is used, it should be employed in amounts less than 1.2% by weight of the final composition, with 0.45% being preferred. When amounts in excess of this are used, the strength of the prefired article is greatly decreased.

In addition to the water contained in the latex, thickening agents, and surfactants, the composition further contains 6% to 20% water added as a primary vehicle. Of course, the amount of water in these separate ingredients can be varied with an equivalent variation in the amount of water added as primary vehicle.

The casting compositions of the invention are formed by thoroughly mixing the constituents followed by de-airing of the composition. Thorough mixing can be achieved by placing the components of the composition on a jar roller for a period of time, for example, about 16 hours at a rotation of 60 r.p.m. The composition is then de-aired on the same jar roller, for example by utilizing a rotation of 16 r.p.m. Following this, the casting composition is ready for use.

Films can be formed by metering the casting composition from a constant head reservoir into a Mylar or other suitable film where it is leveled to a uniform thickness by a doctor blade. The cast is dried by the application of heat. Drying is usually accomplished by casting onto a heated surface, but the use of an oven or radiant heat lamps will suffice. Temperatures of approximately 65° are usually sufficient for this purpose. After drying for approximately 2 hours, the warm cast is stripped from the Mylar film. Desired shapes are then die stamped from the dry sheet, placed on a refractory tile, and fired to 1620° C. for 2 hours. Obviously, ceramic articles can be formed from the compositions of this invention by other techniques well known in the art.

The following examples will point out, by way of illustrations, certain preferred embodiments of this invention.

EXAMPLE 1

305 grams of an aqueous emulsion comprised of a 48% Butaprene latex (XR–3100), are added to 630 grams of water in 1000 ml. flask. To the resulting mixture, there are added 22 grams of a 25% aqueous solution of the sodium salt of a carboxylated polyelectrode (Tamol 731), 20 grams of a 50% solution in ethylene glycol of a ditertiary acetylenic glycol (Surfynol 104E), and 34 grams of triethanolamine.

Eighty cc. of 15.3 molar ammonium hydroxide solution are added to 200 cc. of a 25% aqueous solution of polyacrylic acid (Acrysol A–1), to adjust the pH to 9.2. 49 grams of the resulting ammoniated polyacrylic acid solution are then added to the 1000 ml. flask containing the other ingredients.

The content of the 1000 ml. flask is then transferred to a 1.33 gal. jar mill containing 3950 grams of alumina having a particle size of between .5 and 12 microns and 7 lbs. of ⅝" diameter Burundum high density alumina grinding media. The mill is sealed and placed on a 60 r.p.m. jar roller for 16 hours to thoroughly mix the composition. The grinding media is then removed and the composition poured into 1 gal. glass jar and de-aired on a 16 r.p.m. jar roller for 36 hours. The casting composition is now ready for use.

Alumina ceramic plates having a width to thickness ratio greater than 10 to 1 are readily formed from this casting composition. The composition is placed in a constant head reservoir and metered onto a 0.01" thick flexible film, such as Mylar, where it is leveled to a uniform thickness by a doctor blade. The cast is dried by heating to a temperature of 65° C. for 2 hours. Following this, the cast is stripped from the warm film and die stamped to the desired shape. The shaped green articles are then placed on a refractory tile and fired to maturity (in the case of alumina, 1620° C. for two hours is a typical schedule).

The alumina articles produced from this casting composition have uniform density and void free surfaces. The void free surfaces are obtained by the complete de-airing of the slip prior to the casting operation. The high solid loading of the casting composition results in low firing shrinkage, on the order of 13%, of the green articles upon firing. The fired articles contain very low binder residue since all of the ingredients of the binder are volatile. Furthermore, since the major constituent of the suspending phase is water, there is no need to take precaution against the health hazards presented by organic solvents during the drying and firing steps. Since the green articles produced are strong and self-supporting due to the flexibility given to them by the synthetic latex binder, they can be easily handled and the risk of breakage is light.

EXAMPLE 2

A casting composition is prepared in a manner identical with that of Example 1, except that 130 grams of a 2% solution of hydroxyethyl cellulose (Natrosol 250R) are substituted for the polyacrylic acid solution used in Example 1. This composition can be used to form void free casts having good flexibility and green strength.

EXAMPLE 3

A casting composition is prepartd in a manner identical with that of Example 1, except that the ethylene glycol solution of the ditertiary acetylenic glycol is omitted and a total of 20.4 grams of the 25% aqueous solution of the sodium salt of a carboxylated polyelectrolyte (Tamol 731), are used. This substitution does not affect the final properties of the casting composition and good casts can be formed from the composition using the method set forth in Example 1.

EXAMPLE 4

A casting composition is prepared by adding 3.4 cc. of a 15.3 molar aqueous ammonium hydroxide solution to 8.6 cc. of a 25% aqueous solution of polyacrylic acid (Acrysol A-1), to adjust the pH to 9.2. Twelve ml. of the resulting ammoniated polyacrylic acid solution are added to a 1000 ml. flask containing 58 ml. of an aqueous emulsion comprised of 48% of butaprene latex (XR-3100), and 140 grams of water. The contents of the 1000 ml. flask are then transferred to .50 gal. jar mill containing 790 grams of alumina having a particle size of between .2 and 12 microns and 3 lbs. of 5/8" diameter high density alumina grinding media. The mill is sealed and placed on a 60 r.p.m. jar roller for 16 hours to thoroughly mix the composition. The grinding media is then removed and the composition de-aired by pouring into a ½ gal. glass jar which is placed on a 16 r.p.m. jar roller for 36 hours.

The casting composition produced by this technique can be used to form void free, uniform density, alumina articles by the method set forth in Example 1. Thus, the ammoniated polyacrylic acid solution can be used as a dispersing agent and low foaming surfactant in this system. As shown by the results obtained with the composition, it is not necessary to employ conventional surfactants in the system.

The casting composition of this invention can be used to produce a wide variety of fired ceramic articles. Primarily, this composition is used to produce alumina substrates for thin film microcircuits, although it can be used to produce sheets of glass or other ceramic compositions from which thin, flat shapes (discs, washers, bars, etc.) can be formed.

All percentages recited in this specification and the appended claims are percent by weight.

While there have been shown and described and pointed out the fundamental novel features of the invention as applied to the preferred embodiment, it will be understood that various omissions and substitutions and changes in the details of the composition illustrated may be made by those skilled in the art without departing from the spirit of the invention. It is the intention, therefore, to be limited only as indicated by the scope of the following claims.

What is claimed is:
1. A composition for slip casting sheets, which upon sintering, provide smooth non-porous ceramic articles suitable for use as substrates for electric devices, consisting essentially of
   an aqueous latex emulsion of a styrene-butadiene copolymer, a dispersing agent and from 70% to 83% by weight of sinterable, non-hygroscopic, ceramic particles having a size distribution of from about 0.2 to about 12 microns.
2. The composition of claim 1 further comprising a thickening agent.
3. The composition of claim 1 further comprising from 2.6% to 5.6% of an approximately 2% solution of hydroxyethyl cellulose, as a thickening agent.
4. A composition for slip casting sheets, which upon sintering provides smooth, non-porous ceramic articles suitable for use as substrates for electric devices, consisting essentially of
   from 4% to 12% of an aqueous latex emulsion containing from 47% to 49% by weight of a styrene-butadiene copolymer, from 6% to 20% water, and an amount of surfactant effective to disperse added ceramic particles, and from 70-83% of sinterable, non-hygroscopic ceramic particles having a size distribution of from about 0.2 to about 12 microns.
5. The composition of claim 4 further comprising, as a surfactant and thickening agent, not more than 2% of a 25% aqueous solution of polyacrylic acid.
6. The composition of claim 4 further comprising, as a surfactant, not more than 1.5% of a 25% aqueous solution of a sodium salt of a carboxylated polyelectrolyte.
7. The composition of claim 4 further comprising, as a surfactant, not more than 2.5% of a 50% solution of ditertiary acetylenic glycol in ethylene glycol.
8. The composition of claim 4 further comprising from 2.6% to 5.6% of an approximately 2% solution of hydroxyethyl cellulose, as a thickening agent.
9. The composition of claim 4 wherein said ceramic particles are alumina.
10. A composition for slip casting sheets, which upon sintering provide smooth, non-porous ceramic articles suitable for use in substrates for electric devices, consisting essentially of
    from 4% to 12% of an aqueous emulsion containing from 47% to 49% by weight of a styrene-butadiene copolymer from 6% to 20% water, not more than 2% of a 25% aqueous solution of polyacrylic acid, not more than 1.5% of a 25% aqueous solution of a sodium salt of a carboxylated polyelectrolyte, and not more than 2.5% of a 50% solution of a ditertiary acetylenic glycol in ethylene glycol, and
    from 70% to 83% of sinterable, non-hygroscopic ceramic particles having a particle size distribution of from 0.2 to 12 microns.
11. A composition of claim 10 further comprising not more than 1.2% triethanolamine.
12. The composition of claim 10 wherein said particulate material is alumina.
13. A composition for slip casting alumina sheets, which upon sintering provide smooth, non-porous alumina articles suitable for use as substrates or electric devices, consisting essentially of
    about 6.1% of an aqueous latex emulsion containing about 48% by weight of a styrene-butadiene copolymer, about 0.98% of a 25% aqueous solution of polyacrylic acid, about 0.4% of a 50% solution of a dietertiary acetylenic glycol in ethylene glycol, about 0.44% of a 25% aqueous solution of a carboxylated polyelectrolyte, about 0.45% triethanolamine, and the remainder water, and
    dispersed in said emulsion, about 78.9% of alumina particles having a particle size distribution of from about 0.2 to 12 microns.

References Cited

UNITED STATES PATENTS

| | | | |
|---|---|---|---|
| 2,582,993 | 1/1952 | Howatt | 264—63 |
| 3,125,618 | 3/1964 | Levinson | 106—39 |
| 2,293,099 | 8/1942 | Barnes et al. | 264—63 |
| 2,847,314 | 8/1958 | Fisher | 106—39 |
| 3,011,986 | 12/1961 | Operhall et al. | 260—29.75 |

MURRAY TILLMAN, Primary Examiner

W. J. BRIGGS, Sr., Assistant Examiner

U.S. Cl. X.R.

106—39, 47, 52, 53, 54; 260—29.7; 264—63

PO-1050
(5/69)

UNITED STATES PATENT OFFICE
CERTIFICATE OF CORRECTION

Patent No. 3,472,803      Dated October 14, 1969

Inventor(s) Paul W. Andrews and Forrest I. Peters

It is certified that error appears in the above-identified patent and that said Letters Patent are hereby corrected as shown below:

```
Column 1, line 21, "first" should read ''fired''.
Column 1, line 24, "later" should read ''latex''.
Column 2, line 11, "in-" should read ''ex-''.
Column 3, line 25, "The" should read ''This''.
Column 4, line 68, "light" should read ''slight''.
Column 4, line 71, "prepared" should read ''produced''.
Column 5, line 4, "preparted" should read ''prepared''.
```

SIGNED AND SEALED
MAY 26 1970

(SEAL)
Attest:

Edward M. Fletcher, Jr.
Attesting Officer

WILLIAM E. SCHUYLER, JR.
Commissioner of Patents